United States Statutory Invention Registration [19]

[11] Reg. Number: H292

Klose et al. [43] Published: Jun. 2, 1987

[54] APPARATUS FOR THE DETECTION OF ANGLES-OF-ARRIVAL OF RADIO FREQUENCY SIGNALS

[75] Inventors: Dirk R. Klose, Eatontown, N.J.; George Szentirmai, Santa Clara; Barry T. French, Fullerton, both of Calif.

[73] Assignee: The United States of America as represented by the Secretary of the Army, Washington, D.C.

[21] Appl. No.: 863,759

[22] Filed: May 7, 1986

[51] Int. Cl.[4] ..... G01S 1/30; G01S 5/02

[52] U.S. Cl. ..... 342/394; 342/424

[56] References Cited

U.S. PATENT DOCUMENTS 4,443,801 4/1984 Klose et al. ..... 343/442

OTHER PUBLICATIONS

"Applications of High Speed Charge Transfer Devices" by B. T. French, The Fifth International Conference on CCDs, Sep. 1979, pp. 279–279n.

*Primary Examiner*—Stephen C. Buczinski
*Assistant Examiner*—Linda J. Wallace
*Attorney, Agent, or Firm*—Anthony T. Lane; Sheldon Kanars; John K. Mullarney

[57] ABSTRACT

Incoming radio frequency signals from one or more remote transmitters, that may be changing or "hopping" in frequency, are received at two closely spaced antennas. A pair of Chirp-Z transform processors are respectively coupled to said antennas. The transform processors are operated in synchronism and produce a pair of sampled comb filter output responses, each of which comprises a multiple of frequency "bins" distributed over a given spectrum. The bins are read out of the Chirp-Z processors in a synchronous sequential order, and each bin is represented by a pair of signals in phase quadrature. The phase quadrature signals of corresponding bins are multiplied in a predetermined manner and the products thereof are selectively added and subtracted to provide a predetermined function (tan Φ) of the phase difference (Φ) between the signals incident on the pair of antennas. This predetermined function is coupled to a processor that calculates a trigonometric function ($\sin^{-1}$) thereof which is indicative of the angle-of-arrival of the incident wave(s).

5 Claims, 2 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

APPARATUS FOR THE DETECTION OF ANGLES-OF-ARRIVAL OF RADIO FREQUENCY SIGNALS

The invention described herein may be manufactured used, and licensed by or for the Government for governmental purposes without the payment to us of any royalties thereon.

TECHNICAL FIELD

The present invention relates to the detection of angles-of-arrival (AOA) of a wide spectrum of radio frequency signals by the use of Chirp-Z transform circuits utilizing high speed charge-coupled devices.

BACKGROUND OF THE INVENTION

Various techniques exist in the prior art for finding the direction (AOA) of a radio frequency source. The most well known of these is probably what might be termed standard heterodyning techniques. In accordance with these techniques a heterodyne receiver is tuned for peak output, and may also provide a readout of the frequency in question. Direction finding can be accomplished through the use of a highly directional antenna. Such techniques are very time comsuming and clearly not possible in instances where the signal source is "hopping" or changing rapidly in frequency.

A more sophisticated prior art technique might be categorized as the Bragg cell acousto-optic technique. In this technique a laser beam is reflected from the surface of a surface acoustic wave device carrying an acoustic representation of the signal of interest and the angle of reflection, called the Bragg angle, is measured. This angle of reflection varies as a function of frequency and, if desired, can be used for frequency determination. The angle-of-arrival at the antennae of such a system is determined by measuring the time the incoming signal arrives at each antenna. In order to make this measurement with any significant degree of resolution the antennae must be separated by a substantial distance, thereby precluding the use of an airborne measurement platform and otherwise limiting the effective application and use of this technique. In addition, several measurements of a given signal are needed since an integration is performed over several cycles when this technique is used.

The U.S. Pat No. 4,443,801 to D. R. Klose et al., issued Apr. 17, 1984, discloses apparatus which performs high resolution angle-of-arrival measurements on multiple signals of different frequency. The invention disclosed therein is of particular utility when the signal source, or sources, is "hopping" in frequency. The Klose et al patent utilizes a pair of SAW Chirp-Z transform circuits for determining the phase difference between radio frequency signals received at two closely spaced ($\frac{1}{2}$ to 2 wavelengths) antennae. The Klose et al patent allows one to detect a class of frequency hopping signals that hop over an extremely broad bandwidth, but it necessitates the use of a relatively coarse detection channel or "bin" width. The concept of the Klose et al patent is not suitable if the receiver apparatus is required to cover a large number of frequency bins (e.g. $\geqq 256$) over a broad spectrum in which the spectrum samples for bins for each hop are required to be of very narrow bandwidth.

SUMMARY OF THE INVENTION

It is a primary object of the present invention to detect and measure precisely the angle-of-arrival (AOA) of a wide spectrum of radio frequency signals whether the same are emanating from a single hopping source or from a large number of sources.

A related object of the invention is to provide angle-of-arrival apparatus that has the ability of sampling a large number of times over a given spectum, with the spectrum samples or bin widths of each hop bin being of very narrow bandwidth.

These and other objects are attained in accordance with the present invention wherein incoming radio frequency signals from one or more remote transmitters, that may be hopping in frequency, are received at two closely spaced antennas. Each of the received signals is respectively coupled to one of a pair of chirp-Z transform processors. The chirp-Z processors are operated in synchronism and provide a pair of sampled comb filter output responses, each of which comprises a multiple of spectrum samples or frequency bins distributed over a predetermined spectrum. The bins are read out of the processors in a sequential order, and in synchronism, and each bin is represented by a pair of signals (R,I) in-phase and quadrature components. The in-phase and quadrature signals of synchronous bins contain the requisite phase difference information for angle-of-arrival determination(s). The phase quadrature signals of corresponding bins are multiplied in a predetermined manner and the products thereof are selectively added and subtracted to provide a predetermined function ($\tan\Phi$) of the relative phase shift ($\Phi$) between the separately received signals. This predetermined function is coupled to a processor that calculates a trigonometric function ($\sin^{-1}$) thereof, which is indicative of the angle-of-arrival of the incident wave(s).

BRIEF DESCRIPTION OF THE DRAWINGS

The invention will be more fully appreciated from the following detailed description when the same is considered in connection with the accompanying drawings in which.

DETAILED DESCRIPTION

Figure 1:
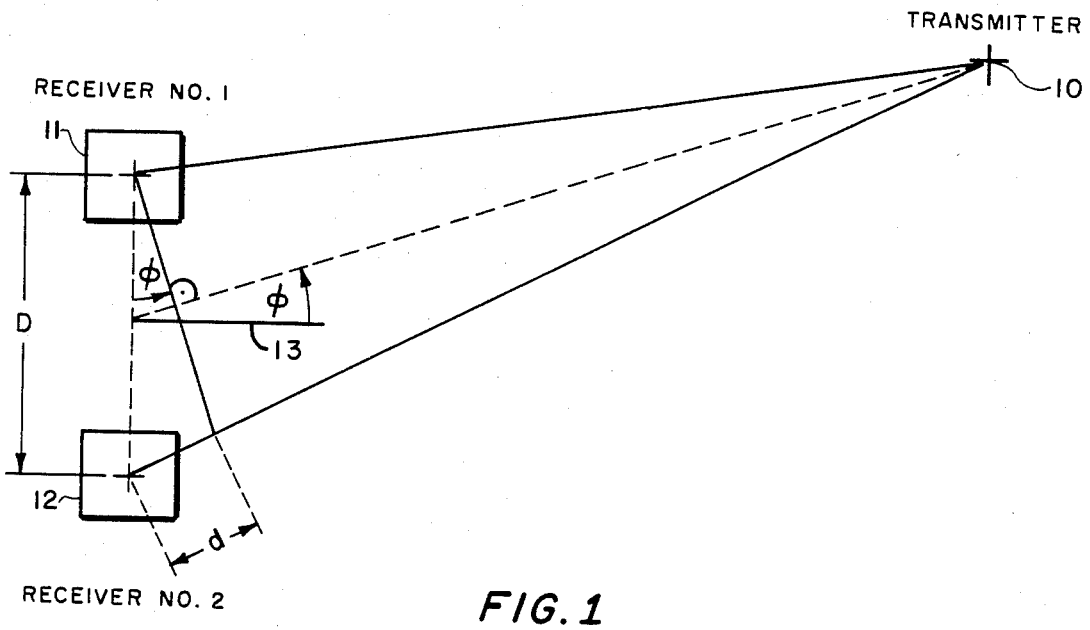
FIG. 1 illustrates the angle-of-arrival angle sensing concept used by the present invention.

For purposes of illustration it is assumed herein that the incoming radio frequency signals emanate from a single source or transmitter 10, as shown in FIG. 1, and that the signal source is hopping in frequency, for example, over a frequency band from 20 to 30 megahertz. However, as will be further explained hereinafter, the system of the invention could, in practice, be more elaborate than the simple arrangement shown in FIG. 1, and further it is capable of precisely determining the AOA's of a large number of signal transmissions which may, or may not, be frequency hopping. The two receivers 11 and 12 of FIG. 1 are separated only a short distance apart, typically less than $\frac{1}{2}$ of the shortest wavelength of the incoming RF signal(s). The angle of interest (i.e. the AOA) is the angle $\phi$ with respect to the boresight 13. The equality of the two angles designated $\phi$ in FIG. 1 is readily apparent from simple trigonometry principles. With a transmitter in the indicated location, the angle $\phi$ can be found by simply detecting the phase difference ($\Phi$) of the incident waves on the two receivers.

In FIG. 1, the difference in distances (d) is given by:

$$d = D \sin \phi$$

where D is the distance between the receivers 11 and 12. This difference in distances (d) causes an apparent phase shift $\Phi$ between the received signals, which is given by:

$$\psi = \partial\pi \frac{d}{\lambda} = \partial\pi D \frac{\sin\phi}{\lambda}$$

where $\lambda$ is the wavelength of the signal, or $$\psi = \frac{\omega D}{v} \sin \phi$$

where $v = 3 \times 10^8$ m/sec, the velocity of light and $\omega$ is the radian frequency.

The receivers 11 and 12 serve to detect not only the existence of a spectral line (frequency) but its phase as well. Or rather, they serve in the detection of the phase difference by which the same frequency is shifted between the two receivers.

Figure 2:
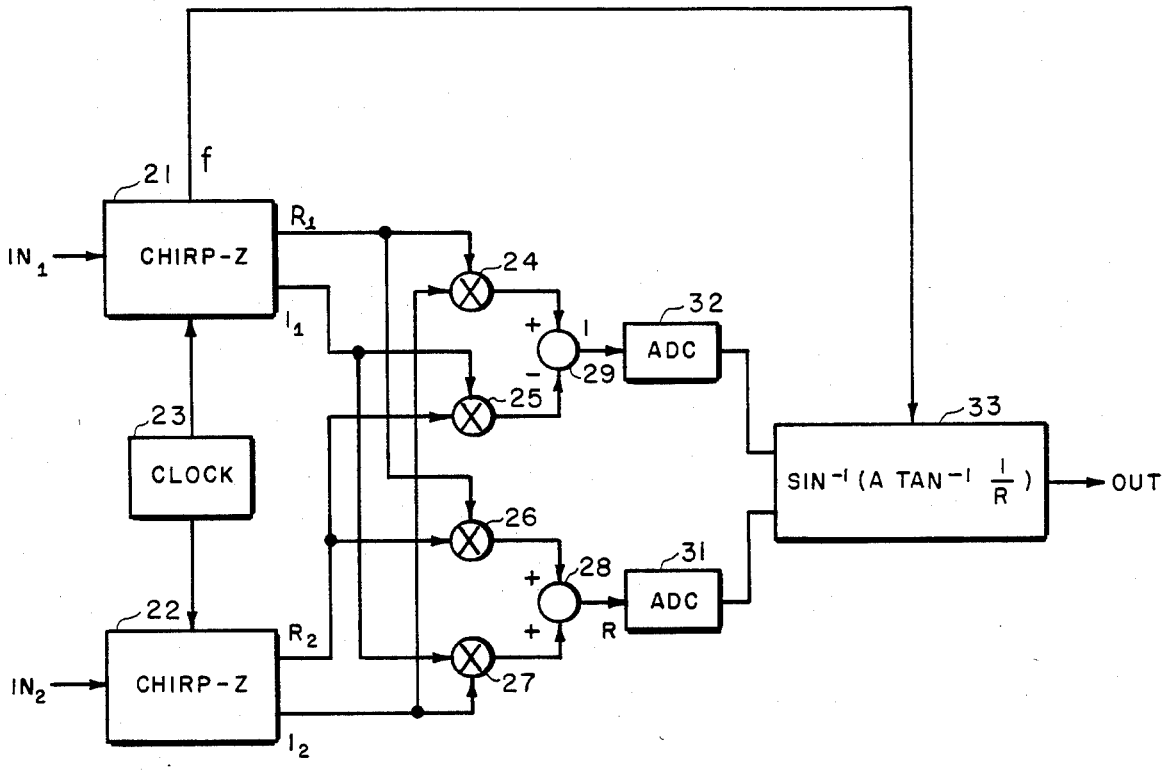
FIG. 2 is a schematic block diagram of angle-of-arrival apparatus in accordance with the present invention.

Turning now to FIG. 2, the received signals are designated $IN_1$, and $IN_2$. The received signals are initially down-converted to some intermediate frequency and, together, they bear the phase difference which is necessary to provide AOA indications. Each of the IN signals is delivered to a respective Chirp-Z transform circuit or processing module 21 or 22. Each of the Chirp-Z transform processors is comprised of high speed charge-coupled devices. The Chirp-Z transform circuits are similar and are described in great detail in an article entitled "Applications of High Speed Charge Transfer Devices" by B. T. French (a co-inventor of the present invention), The Fifth International Conference on CCDs, September 1979, pages 279–279n.

For completeness of the present disclosure the Chirp-Z transform algorithm, carried out by the Chirp-Z transform system shown in FIG. 3 of the cited French article, will be briefly described. The sliding Chip-Z transform is defined for a sampled input X(n) as:

$$Y(k) = \sum_{n=k}^{N+k-1} x(n)\epsilon^{-j(2\pi nk/N)} \quad k = 0, 1, \ldots N-1$$

$$\text{Using: } nk = -\tfrac{1}{2}[(n-k-N_o)^2 - (n-N_o)^2 - (k+N_o)^2 + N_o^2]$$

$$\text{We get: } Y(k) = \epsilon^{j\frac{\pi N_o^2}{N}} \epsilon^{-j\frac{\pi(k+N_o)^2}{N}} \sum_{n=k}^{N+k-1} \left\{ x(n)\epsilon^{-j\frac{\pi(n-N_o)^2}{N}} \right\} \epsilon^{j\frac{\pi(n-k-N_o)^2}{N}}$$

Where $N_o$ is arbitrary and is selected as $N_o = (N-1)/2$ to yield a symmetrical CCD design. The terms in front of the summation sign yield a constant and a frequency-dependent phase terms that drop out of the phase difference calculations, hence can be safely ignored. The term $$\epsilon^{-j\frac{\pi(n-N_o)^2}{N}} = \cos\frac{\pi(n-N_o)^2}{N} - j\sin\frac{\pi(n-N_o)^2}{N}$$

represents the familiar prechirp multiplication. Denoting:

$$\bar{x}(n) = x(n)\epsilon^{-j\frac{\pi(n-N_o)^2}{N}}$$

$$\text{we get finally: } \bar{y}(k) = \sum_{n=k}^{N+k-1} \bar{x}(n)\epsilon^{j\frac{\pi(n-k-N_o)^2}{N}}$$

which represents the convolution of the (complex) signals $$\bar{x}(n) \text{ and } \epsilon^{j\frac{\pi(n-N_o)^2}{N}}$$

Which completes the operational description of the transform algorithm.

The following description is for the purpose of providing a more functional, and perhaps more understandable, explanation of the Chirp-Z transformation operation. The processors 21 and 22 effectively sample the two input signals $IN_1$ and $IN_2$ in a synchronous manner. This synchronous sampling is guaranteed by the use of a common sampling clock 23. The clock 23 may comprise a multi-stage binary counter that counts to a given count and then recycles, and it does this in a repetitive fashion. Each of the two Chirp-Z processors 21 and 22 collects a subset of sampled input data points and manipulates these data sample points to generate a comb filter structure and output response. The output of each Chirp-Z processor is a sequential representation of the sampled comb filter output responses. Each comb filter output response is represented as a complex quadrature signal $R_1$ and $I_1$ or $R_2$ and $I_2$, as appropriate to processor 21 or 22. Thus, in effect, the output of 21 or 22 is a sample output of the response of a comb filter bank to the input signal. The bins or spectrum samples of the comb filter are read out in a sequential order, and in synchronism between processors 21 and 22. For each bin there is a complex signal representation in sample form; that is, each bin has an R and I associated with it. The term bin or frequency bin is used in this art to represent a small frequency window or frequency channel. The complex representation of the output of each frequency bin (i.e., R and I) is a representation of the received signal in which phase information is present. The processors 21 and 22 are read out in synchronism so that any time a given frequency bin is read out of one processor the corresponding frequency bin is also read out of the other processor. Thus, we are able to effectively "compare" the complex output signal representations of these frequency bins to eventually derive AOA information.

Each processor channelizes a given width, intercept window into n detection frequency bins. The output of the processors 21 and 22 is a sequential or commutative read out of each one of these bins. The commutation process is cyclical in that over a given period of time we go through the read out of bin 1, bin 2, bin 3, etc. and then we come back to bin 1 after a given interval. The bins are read out at a clock rate which is typically 15 to 20 megahertz. The Chirp-Z transform processors 21 and 22 can be designed to cover essentially any desired frequency band. Also, the processors can be designed to provide a desired number of bins (e.g;≧256) and each bin can comprise a very limited channel or bandwidth, such as 10 kilohertz or even less.

The two input sequences:

$$\left.\begin{matrix} x_1(n) \\ x_2(n) \end{matrix}\right\} n = 0, 1, \ldots N-1$$

yield two output sequences:

$$\left.\begin{matrix} Y_1(k) \\ Y_2(k) \end{matrix}\right\} k = 0, 1, \ldots M-1$$

where we are interested in the phase difference between $Y_1$ (k) and $Y_2$ (k) for specified values of k, but in any case k is the same for both.

The Chirp-Z outputs $R_1$, $I_1$, or $R_2$, $I_2$ are the real and imaginary parts of the spectral lines $Y_1$ (k) and $Y_2$(k). Using the trigonometric identity:

$$\tan\psi = \tan(\psi_2 - \psi_1) = \frac{\tan\psi_2 - \tan\psi_1}{1 + \tan\psi_2 \cdot \tan\psi_1}$$

$$= \frac{\frac{I_2}{R_2} - \frac{I_1}{R_1}}{1 + \frac{I_1}{R_1}\frac{I_2}{R_2}} = \frac{R_1I_2 - I_1R_2}{R_1R_2 + I_1I_2} = \frac{I}{R},$$

which is what the circuitry (i.e., multipliers 24–27, adder 28 and subtractor 29) following the Chirp-Z processors calculates. Multiplier 24 multiplies $R_1$ and $I_2$, multiplier 25 multiplies $I_1$ and $R_2$, and the latter is subtracted from $R_1.I_2$ in subtractor 29. Multiplier 26 multiplies $R_1$ and $R_2$, multiplier 27 multiplies $I_1$ and $I_2$, and the latter is added to $R_1.R_2$ in adder 28. To repeat, this latter circuitry simply carries out the mathematical expression:

$$\frac{R_1I_2 - I_1R_2}{R_1R_2 + I_1I_2}.$$

$R_1$ and $R_2$ are the in-phase components of the spectral lines and $I_1$ and $I_2$are the quadrature components. That is, $R_1$ and $I_1$, and $R_2$ and $I_2$, are phase quadrature components of the spectral lines $Y_1$ (k) and $Y_2$ (k). The complex quadrature vector representations R and I contain the requisite phase difference information for AOA determination(s).

The output signals from adder 28 and subtractor 29 are respectively coupled to analog-to-digital converters 31 and 32. The A-to-D converters can be of conventional design and serve to convert the input analog signals (I and R) to 6–8 bit digital signals, for example. The converters are necessary since the AOA calculation to be explained hereinafter is best done digitally.

The next, and last, step is the calculation of the apparent angle $\phi$ (i.e., AOA) according to the expression:

$$\phi = \sin^{-1}\left[A\tan^{-1}\frac{I}{R}\right] \quad (1)$$

where $$A = 2\pi f_{in}.\ D$$

where $f_{in}$ is the input frequency to the processor and D is the distance between the receivers in meters.

The composite vector representations R and I are coupled, via the A-to-D converters, to the arc sine processor 33. The third input to processor 33 is a (digital) frequency word ($f_{in}$), which basically tells the processor the effective frequency of the incoming signal. This latter signal is derived from either of the chirp-Z processors 21 or 22. More precisely, the digital frequency signal ($f_{in}$) represents the middle of a particular frequency bin at a given instant in time, which implicitly represents the substantially frequency of the incoming signal. The processor 33 takes these three input digital words and computes the angle $\phi$ in accordance with the algorithmic expression of equation (1), above.

The arc sine processor 33 can be implemented in several different ways. A main frame, host computer, or a dedicated microprocessor, can be used to carry out a software algorithmic computation of the angle $\phi$ in accordance with the equation (1), above. This is a relatively straightforward programming task. Alternatively, and for very fast real time operation, the computation can be carried out by means of a microprocessor and look up table(s) whose row/column matrix(es) are the R and I vectors. The result of the look-up operation is followed by a relatively simple processing function to provide the desired answer ($\phi$).

Alternatively, if the value of A in equation (1) above is a constant, the computation of $\phi$ can be performed by one division and a table lookup. Further, if $|I| > |R|$ we can use $$\phi = \sin^{-1}\left(A\cot^{-1}\frac{R}{I}\right).$$

With such a simple operation we could do away with the four multipliers and two algebraic summers and do the computation in accordance with the expression:

$$\phi = \sin^{-1}(A(\psi_2 - \psi_1))$$

$$= \sin^{-1}\left(A\left(\tan^{-1}\frac{I_2}{R_2} - \tan^{-1}\frac{I_1}{R_1}\right)\right).$$

This latter calculation can be performed by two divisions and three table lookups from two tables, interspersed with a subtraction and a multiplication (if A is not constant). All of these are fast operations which can be done by a host computer, a dedicated microprocessor, or even by dedicated hardware.

As will be appreciated by those in the art, additional base lines can be used to achieve greater precision, and adjacent base lines can, in fact, share a Chirp-Z transform circuit; i.e., a Chirp-Z processor can be used in common between two adjacent base lines. If, as previously assumed, the first base line is of a distance $D = \pi/2$, the second base line can be equal to $3\pi$, the fourth base line equal to $4\pi$, or $5\pi$, or $6\pi \ldots 10\pi$, and so on. The provision of additional base lines increases the precision; i.e., the more base lines used the greater the degree of precision obtained. As will be further appreciated by those skilled in the art, the actual configuration of the antenna array or direction finding antenna array is dependent upon the final system application and can be either a linear or a non-linear configuration depending upon the needs of the actual system.

For purposes of illustration, it was assumed that the incoming radio frequency signal came from a single source or transmitter which hopped in frequency. However, the invention can also be utilized to provide the angles-of-arrival of a great many signal sources, assuming each at a different fixed frequency. For example, using Chirp-Z processors having 256 frequency bins, the system of the invention could provide angle-of-arrival indications for 256 different signal sources at the same time.

For further illustrative purposes, assume that the typical frequency hopping signal hops at a rate that is no faster than once every 256 clock intervals; this still represents a very rapid and realistic hopping rate. Assume further that in an environment of multiple hopping signals that these occupy, at each instant of time, unique frequency bins during the observation interval (256 clock pulse periods). Under these conditions multiple hopping signals look, and can be handled, no differently than multiple non-hopping signals. Thus, during a given observation interval, an AOA measurement can be made for up to 256 incoming signals. And, by collecting angle measurements from multiple observation windows, and looking for angle consistency, up to 256 unique frequency hopping signals can be (AOA) resolved. Alternately, of course, an appropriate mixture of fixed and hopping signals can also be resolved.

Without further belaboring the point, it should be obvious at this time that the above described arrangement is merely illustrative of the application and of the principles of the present invention, and numerous modifications thereof may be devised by those skilled in the art without departing from the spirit and scope of the invention.

What is claimed is:

1. Apparatus for detecting the angles-of-arrival of a wide spectrum of radio frequency signals comprising a pair of closely spaced antennas, a pair of Chirp-Z transform means each respectively coupled to one of said spaced antennas, said pair of transform means being operated in synchronism and providing a pair of sampled comb filter output responses each of which comprises a multiple of frequency bins distributed over said spectrum, the bins being outputted from said pair of transform means in synchronous sequential order, each frequency bin being represented by a pair of signals in phase quadrature, arithmetic means responsive to said phase quadrature signals to form a predetermind function ($\tan\Phi$) of the phase difference($\Phi$) between the respective signals received at said spaced antennas, and processor means coupled to the output of said arthmetric means for calculating from said predetermined function the angles-of-arrival of signals incident on said pair of antennas.

2. Apparatus as defined in claim 1 wherein the phase quadrature signals of synchronous bins contain the requisite phase difference information for angle-of-arrival determinations.

3. Apparatus as defined in claim 2 where in said arithmetic means serves to multiply the phase quadrature signals of corresponding sychronous bins in a predetermined manner, with the products thereof selectively added and subtracted to provide said predetermined function ($\tan \Phi$).

4. Apparatus as defined in claim 3 wherein the phase quadrature signals $R_1$ and $I_1$, $R_2$ and $I_2$ from said pair of transform means represent the real and imaginary parts of the received spectral lines or frequencies, and said predetermined function is given by:

$$\tan \psi = \frac{R_1 I_2 - I_1 R_2}{R_1 R_2 + I_1 I_2} = \frac{I}{R}.$$

5. Apparatus as defined in claim 4 wherein the angle-of-arrival ($\phi$) is determined as:

$$\phi = \sin^{-1}\left[A\tan^{-1}\frac{I}{R}\right]$$

where $A = 2\pi f_{in} D$, and where $f_{in}$ is the input frequency, and D is the distance between the antennas in meters.

* * * * *